US008607547B2

(12) United States Patent
Tanoura et al.

(10) Patent No.: US 8,607,547 B2
(45) Date of Patent: Dec. 17, 2013

(54) FLUE GAS PURIFYING DEVICE

(75) Inventors: Masazumi Tanoura, Kanagawa (JP); Kenji Muta, Kanagawa (JP); Minoru Danno, Kanagawa (JP); Masatoshi Katsuki, Kanagawa (JP); Yuuko Ujihara, Kanagawa (JP); Daishi Ueno, Tokyo (JP); Takashi Fujinaga, Hyogo (JP); Eiji Kato, Hyogo (JP); Shinichiro Asami, Hyogo (JP); Tadashi Aoki, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 321 days.

(21) Appl. No.: 13/132,752

(22) PCT Filed: Dec. 4, 2009

(86) PCT No.: PCT/JP2009/070392
§ 371 (c)(1),
(2), (4) Date: Jun. 3, 2011

(87) PCT Pub. No.: WO2010/067760
PCT Pub. Date: Jun. 17, 2010

(65) Prior Publication Data
US 2011/0239629 A1 Oct. 6, 2011

(30) Foreign Application Priority Data
Dec. 8, 2008 (JP) ................................. 2008-312631

(51) Int. Cl.
*F01N 3/00* (2006.01)
*F01N 3/10* (2006.01)
*F01N 3/02* (2006.01)

(52) U.S. Cl.
USPC .................. 60/286; 60/276; 60/295; 60/298; 60/301; 60/303; 60/320

(58) Field of Classification Search
USPC ........... 60/276, 277, 286, 295, 300, 301, 303, 60/298, 320
See application file for complete search history.

(56) References Cited

U.S. PATENT DOCUMENTS 5,233,934 A * 8/1993 Krigmont et al. ............. 110/345
5,809,775 A 9/1998 Tarabulski et al.
(Continued)

FOREIGN PATENT DOCUMENTS

CN 1448620 A 10/2003
CN 101235741 A 8/2008
(Continued)

OTHER PUBLICATIONS

Korean Office Action dated Nov. 8, 2012, issued in corresponding Korean Patent Application No. 2011-7013004, (8 pages). With English Translation.
Russian Notice of Allowance dated Jan. 14, 2013, issued in corresponding Russian Patent Application No. 2011122981, w/ English translation.
(Continued)

*Primary Examiner* — Thomas Denion
*Assistant Examiner* — Diem Tran
(74) *Attorney, Agent, or Firm* — Westerman, Hattori, Daniels & Adrian, LLP (57) ABSTRACT

An object of the present invention is to provide a flue gas purifying device that can suppress leakage of ammonia and can efficiently decrease nitrogen oxides in flue gas. The object is achieved by a flue gas purifying device including: an exhaust pipe; a urea-water injecting unit that injects urea water into the exhaust pipe; a catalytic unit that includes a urea SCR catalyst that promotes a reaction between ammonia and nitrogen oxides and a support mechanism that supports the urea SCR catalyst in the exhaust pipe, and is arranged on a downstream side to a position where urea water is injected; a concentration measuring unit arranged on a downstream side to the catalytic unit in a flow direction of flue gas to measure an ammonia concentration in flue gas having passed through the urea SCR catalyst; and a control unit that controls injection of urea water by the urea-water injecting unit based on an ammonia concentration measured by the concentration measuring unit.

14 Claims, 7 Drawing Sheets

(56) References Cited

U.S. PATENT DOCUMENTS

| | | | |
|---|---|---|---|
| 6,993,900 B2* | 2/2006 | Upadhyay et al. | 60/286 |
| 7,428,809 B2* | 9/2008 | Wickert et al. | 60/286 |
| 7,673,444 B2* | 3/2010 | Yano et al. | 60/277 |
| 8,397,489 B2* | 3/2013 | Webb et al. | 60/285 |
| 2002/0056273 A1 | 5/2002 | Itoh et al. | |
| 2007/0044456 A1 | 3/2007 | Upadhyay et al. | |
| 2007/0137181 A1 | 6/2007 | Upadhyay et al. | |
| 2008/0178656 A1 | 7/2008 | Nieuwstadt et al. | |

FOREIGN PATENT DOCUMENTS

| | | |
|---|---|---|
| DE | 10 2006 027 357 A1 | 12/2007 |
| JP | 2001-000840 A | 1/2001 |
| JP | 2001-523165 A | 11/2001 |
| JP | 2002-266627 A | 9/2002 |
| JP | 2003-314256 A | 11/2003 |
| JP | 2004-346794 A | 12/2004 |
| JP | 2005-169331 A | 6/2005 |
| JP | 2007-154849 A | 6/2007 |
| JP | 2007-321647 A | 12/2007 |
| JP | 2008-190529 A | 8/2008 |
| JP | 2009-156229 A | 7/2009 |
| JP | 2008-190529 A | 6/2011 |
| KR | 10-0851474 B1 | 8/2008 |
| WO | 99/30811 A1 | 6/1999 |

OTHER PUBLICATIONS

Japanese Notice of Allowance mailed Feb. 26, 2013, issued in corresponding Japanese Patent Application No. 2008-312631; w/partial English translation (3 pages).

Russian Office Action dated Sep. 26, 2012, issued in corresponding Russian patent application No. 2011122981, w/ English translation.

International Search Report of PCT/JP2009/070392, mailing date Feb. 2, 2010.

Written Opinion of The International Searching Authority, issued in corresponding International Application No. PCT/JP2009/070392.

Chinese Office Action dated Jan. 18, 2013, issued in corresponding Chinese Patent Application No. 200980149307.5, w/ English translation.

Canadian Notice of Allowance dated Mar. 27, 2013, issued in corresponding Canadian Patent Application No. 2,745,623.

Korean Notice of Allowance dated Apr. 25, 2013, issued in corresponding Korean Patent Application No. 2011-7013004, w/ partial English translation.

Extended European Search Report dated Jun. 20, 2013, issued in corresponding European application No. 09831864.5.

Chinese Notice of Allowance dated Jun. 26, 2013, issued in the corresponding Chinese Application No. 200980149307.5, with English Translation. (4 pages).

* cited by examiner

FLUE GAS PURIFYING DEVICE

FIELD

The present invention relates to a flue gas purifying device that reduces nitrogen oxides discharged from an internal combustion engine.

BACKGROUND

Gas discharged from an internal combustion engine such as a diesel engine, a gasoline engine, or a gas turbine, that is flue gas, contains nitrogen oxides (NOx) and particulate matters (PM). Particularly, because the diesel engine burns fuel in an oxygen excessive state, nitrogen oxides (NOx) and particulate matters (PM) are contained in a large amount in the fuel. Therefore, a device that decreases particulate matters and a device that decreases nitrogen oxides are provided in an exhaust pipe of the internal combustion engine. As an example of the device that decreases nitrogen oxides, there is a device that decreases nitrogen oxides from flue gas by injecting urea into an exhaust pipe that guides flue gas, produces ammonia from urea in the exhaust pipe, causes the produced ammonia to react with nitrogen oxides in flue gas, and then removes oxygen from nitrogen oxides to produce nitrogen again.

For example, Patent Literature 1 describes a flue gas purifying device in which a DPF device and a selective catalytic reduction catalytic device are sequentially arranged from an upstream side in an exhaust path of an internal combustion engine. Patent Literature 1 also describes a device that calculates NOx emissions, at the time of a normal operation, based on an NOx emissions map for the normal operation, or at the time of forced regeneration of the DPF device, calculates NOx emissions based on an NOx emissions map for forced regeneration, to calculate a feed rate of ammonia aqueous solution corresponding to the calculated NOx emissions, and feeds ammonia aqueous solution into flue gas on an upstream side of the selective catalytic reduction catalytic device so as to reach the calculated feed rate.

Further, Patent Literature 2 describes NOx removal equipment for flue gas discharged from a combustion plant such as a waste incinerator, although it is not for treatment of flue gas from an internal combustion engine. Patent Literature 2 describes a denitration control method in which a NOx concentration in gas before treatment, an ammonia concentration in treated flue gas, a NOx concentration in flue gas, and a flow rate of flue gas are measured, to calculate a flow rate of NOx before treatment, a NOx concentration after treatment, a record of NOx removal efficiency by NOx removal equipment, and an ammonia concentration in treated flue gas based on a measurement result thereof, deviations between the calculated values and target values thereof are respectively calculated to thereby calculate correction values based on the calculated deviations, and a corrected flow rate of NOx is calculated based on at least one of the calculated correction values, thereby controlling a flow rate of ammonia to be injected into flue gas before treatment based on the calculated corrected flow rate of NOx.

CITATION LIST

Patent Literatures

Patent Literature 1: Japanese Patent Application Laid-open No. 2007-154849

Patent Literature 2: Japanese Patent Application Laid-open No. 2005-169331

SUMMARY

Technical Problem

As described in Patent Literature 1, nitrogen oxides can be decreased by controlling an injection amount of urea based on a map created beforehand, and an amount of ammonia can be also adjusted. Furthermore, as described in Patent Literature 2, nitrogen oxides can be also decreased by using at least one of the concentrations of nitrogen oxides, the NOx removal efficiency, and the ammonia concentration in treated flue gas to correct a deviation of flow rate of nitrogen oxides, and the amount of ammonia can be also adjusted.

However, even if the injection amount of urea is adjusted based on the map created beforehand as described in Patent Literature 1, there are problems such as leakage of nitrogen oxides and leakage of ammonia according to operating conditions. To calculate the flow rate of NOx as described in Patent Literature 2, calculation needs to be performed by detecting a flow rate of flue gas and the concentration of NOx (nitrogen oxides), thereby causing a problem that it takes a long time. Further, because emissions of the internal combustion engine change greatly, there is another problem that the flow rate of NOx is difficult to calculate. Furthermore, there is another problem that, even if a filling amount of ammonia is controlled based on a flow rate of NOx, the amount of nitrogen oxides and leakage of ammonia cannot be sufficiently decreased.

The present invention has been achieved in view of the above problems, and an object of the present invention is to provide a flue gas purifying device that calculates an appropriate amount of urea to be injected into an exhaust pipe so that ammonia hardly leaks to a downstream side, thereby efficiently decreasing nitrogen oxides in flue gas.

Solution to Problem

According to an aspect of the present invention, a flue gas purifying device that reduces nitrogen oxides contained in flue gas discharged from an internal combustion engine, includes: an exhaust pipe that guides flue gas discharged from the internal combustion engine; a urea-water injecting unit that injects urea water into the exhaust pipe; a catalytic unit that includes a urea SCR catalyst that promotes a reaction between ammonia produced from the injected urea water and the nitrogen oxides, and includes a support mechanism arranged inside of the exhaust pipe to support the urea SCR catalyst in the exhaust pipe, and is arranged on a downstream side to a position where the urea water is injected in a flow direction of the flue gas; an ammonia-concentration measuring unit arranged on a downstream side to the catalytic unit in a flow direction of the flue gas to measure an ammonia concentration in the flue gas having passed through the urea SCR catalyst; and a control unit that controls injection of the urea water by the urea-water injecting unit based on the ammonia concentration measured by the ammonia-concentration measuring unit.

In this manner, nitrogen oxides in the flue gas can be decreased, while decreasing ammonia in the flue gas discharged from the flue gas purifying device, by controlling the injection of urea water by the urea-water injecting unit by the control unit based on the concentration of ammonia contained in the flue gas having passed through the urea SCR catalyst detected by the ammonia-concentration measuring unit. Further, an amount of calculation can be reduced by controlling the injection amount of urea water based on only a detection value of ammonia, and a device configuration can be simplified.

Advantageously, the flue gas purifying device further includes a treated nitrogen-oxide-concentration measuring unit arranged on a downstream side to the catalytic unit in a flow direction of the flue gas to measure a concentration of nitrogen oxides in the flue gas having passed through the urea SCR catalyst. The control unit controls injection of urea water by the urea-water injecting unit based also on a concentration of nitrogen oxides measured by the treated nitrogen-oxide-concentration measuring unit.

In this manner, by controlling the injection of urea water also by using the concentration of nitrogen oxides in the flue gas having passed through the urea SCR catalyst measured by the treated nitrogen-oxide-concentration measuring unit, nitrogen oxides contained in the flue gas can be further decreased.

Advantageously, the flue gas purifying device further includes a restoring unit that restores the urea SCR catalyst, when an ammonia concentration detected by the ammonia-concentration measuring unit and a concentration of nitrogen oxides measured by the treated nitrogen-oxide-concentration measuring unit both exceed a reference concentration, respectively. Preferably, the restoring unit heats the urea SCR catalyst at a predetermined temperature.

In this manner, by restoring the urea SCR catalyst by the restoring unit, leakage of ammonia and nitrogen oxides can be suppressed. Further, the state of the urea SCR catalyst can be ascertained more accurately by determining the capacity of the urea SCR catalyst based on both the ammonia concentration and the concentration of nitrogen oxides, and it can be suppressed to perform an unnecessary restoration process. As the restoration process, by heating the urea SCR catalyst, the capacity of the urea SCR catalyst can be easily restored.

Advantageously, the flue gas purifying device further includes an informing unit that informs that the urea SCR catalyst needs to be replaced, when an ammonia concentration detected by the ammonia-concentration measuring unit and a concentration of nitrogen oxides measured by the treated nitrogen-oxide-concentration measuring unit both exceed a reference concentration, respectively.

In this manner, by informing that the capacity of the urea SCR catalyst has decreased by the informing unit to urge an operator to replace the urea SCR catalyst, it can be suppressed that the urea SCR catalyst having a decreased capacity is continuously used, and leakage of ammonia and nitrogen oxides can be further suppressed. By determining the capacity of the urea SCR catalyst based on both the ammonia concentration and the concentration of nitrogen oxides, the condition of the urea SCR catalyst can be ascertained more accurately and unnecessary replacement can be reduced.

Advantageously, the flue gas purifying device further includes a pretreatment nitrogen-oxide-concentration measuring unit arranged between the urea-water injecting unit and the catalytic unit in a flow direction of the flue gas to measure a concentration of nitrogen oxides in flue gas. The control unit controls injection of urea water by the urea-water injecting unit based also on a concentration of nitrogen oxides measured by the pretreatment nitrogen-oxide-concentration measuring unit.

In this manner, by controlling the injection of urea water by the urea-water injecting unit based also on the concentration of nitrogen oxides measured by the pretreatment nitrogen-oxide-concentration measuring unit, the injection of urea water can be controlled, while ascertaining an amount of ammonia required for reduction of nitrogen oxides. Further, nitrogen oxides in the flue gas can be further decreased, while further decreasing ammonia in the flue gas discharged from the flue gas purifying device.

Advantageously, the flue gas purifying device further includes: an isocyanic-acid-concentration measuring unit arranged between the urea-water injecting unit and the catalytic unit in a flow direction of the flue gas to measure a concentration of isocyanic acid in flue gas; and a temperature adjusting unit that adjusts a temperature of a flue-gas flow path between the urea-water injecting unit and the catalytic unit in a flow direction of the flue gas. A temperature of the flue-gas flow path is adjusted by the temperature adjusting unit based on a concentration of isocyanic acid measured by the isocyanic-acid-concentration measuring unit.

In this manner, by adjusting the temperature of the flue-gas flow path based on the concentration of isocyanic acid in flue gas, the injected urea water can be reliably turned into ammonia, and the ammonia concentration in flue gas can be controlled more easily.

Advantageously, the flue gas purifying device further includes: a pretreatment ammonia-concentration measuring unit arranged between the urea-water injecting unit and the catalytic unit in a flow direction of the flue gas to measure an ammonia concentration in flue gas; and a temperature adjusting unit that adjusts a temperature of the flue-gas flow path between the urea-water injecting unit and the catalytic unit in a flow direction of the flue gas. A temperature of the flue-gas flow path is adjusted by the temperature adjusting unit based on an ammonia concentration measured by the pretreatment ammonia-concentration measuring unit.

In this manner, by adjusting the temperature of the flue-gas flow path based on the ammonia concentration in flue gas before treatment, the injected urea water can be reliably turned into ammonia, and the ammonia concentration in flue gas can be controlled more easily.

According to another aspect of the present invention, a flue gas purifying device that reduces nitrogen oxides contained in flue gas discharged from an internal combustion engine, includes: an exhaust pipe that guides flue gas discharged from the internal combustion engine; a urea-water injecting unit that injects urea water into the exhaust pipe; a catalytic unit that includes a urea SCR catalyst that promotes a reaction between ammonia produced from injected urea water and the nitrogen oxides and a support mechanism arranged inside of the exhaust pipe to support the urea SCR catalyst in the exhaust pipe, and is arranged on a downstream side to a position where the urea water is injected in a flow direction of the flue gas; a pretreatment nitrogen-oxide-concentration measuring unit arranged between the urea-water injecting unit and the catalytic unit in a flow direction of the flue gas to measure a concentration of nitrogen oxides in flue gas; a treated nitrogen-oxide-concentration measuring unit arranged on a downstream side to the catalytic unit in a flow direction of the flue gas to measure a concentration of nitrogen oxides in the flue gas having passed through the urea SCR catalyst; and a control unit that calculates an ammonia concentration in flue gas having passed through the catalytic unit based on a difference between a concentration of nitrogen oxides measured by the pretreatment nitrogen-oxide-concentration measuring unit and a concentration of nitrogen oxides measured by the treated nitrogen-oxide-concentration measuring unit, and controls injection of urea water by the urea-water injecting unit based on a calculated ammonia concentration.

In this manner, by using the pretreatment nitrogen-oxide-concentration measuring unit and the treated nitrogen-oxideconcentration measuring unit to calculate the ammonia concentration in flue gas and controlling the injection amount of urea water based on the calculated ammonia concentration, nitrogen oxides in flue gas can be decreased, while decreasing ammonia in flue gas discharged from the flue gas purifying device. Further, the device configuration can be simplified by controlling the injection amount of urea water based on only the calculated value of ammonia.

Advantageous Effects of Invention

The flue gas purifying device according to the present invention can decrease nitrogen oxides in flue gas, while decreasing ammonia in flue gas discharged from the flue gas purifying device, by controlling the injection of urea water based on the concentration of ammonia contained in flue gas having passed through the urea SCR catalyst. Further, a calculation amount can be decreased and the device configuration can be simplified by controlling the injection of urea water based on only a detection value of ammonia.

DESCRIPTION OF EMBODIMENTS

Exemplary embodiments a flue gas purifying device according to the present invention will be explained below in detail with reference to the accompanying drawings. The present invention is not limited to the embodiments. In the following embodiments, it is assumed that an internal combustion engine having the flue gas purifying device mounted thereon is a diesel engine, and a vehicle using the diesel engine is explained. However, the internal combustion engine is not limited thereto, and the present invention is applicable to various internal combustion engines such as a gasoline engine and a gas turbine. Further, a device having the internal combustion engine is not limited to a vehicle, and the device can be used as an internal combustion engine of various devices such as a ship and a power generator.

Figure 1:
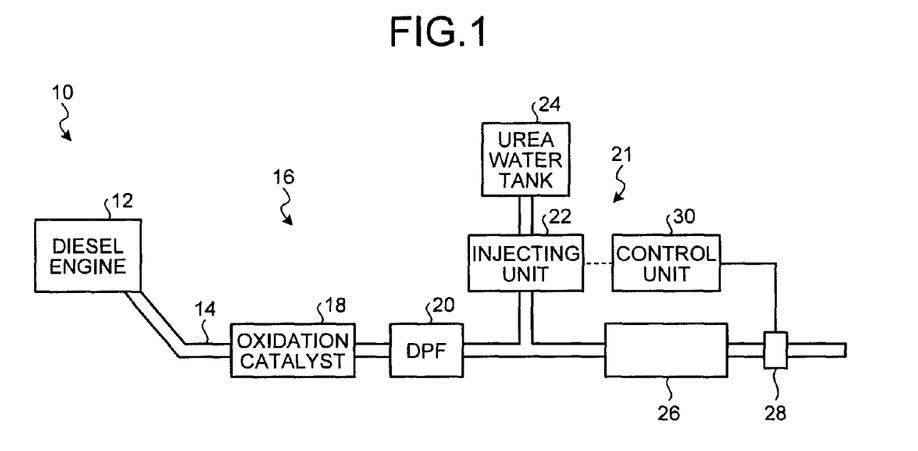
FIG. 1 is a block diagram of a schematic configuration of a vehicle having a diesel engine fitted with a flue gas purifying device according to an embodiment of the present invention.
Figure 2:
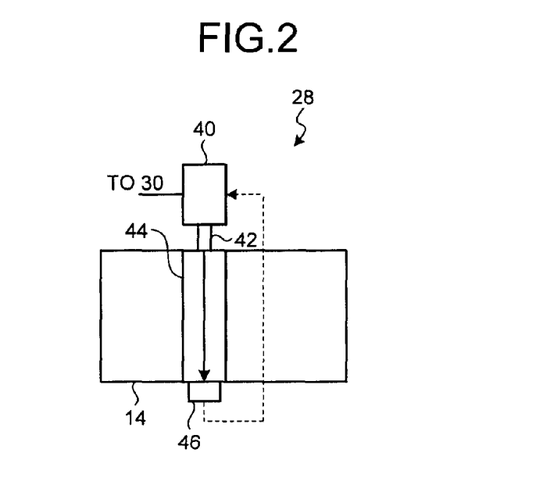
FIG. 2 is a block diagram of a schematic configuration of a concentration measuring unit in the flue gas purifying device for the diesel engine shown in FIG. 1.

FIG. 1 is a block diagram of a schematic configuration of a vehicle having a diesel engine fitted with the flue gas purifying device according to an embodiment of the present invention. FIG. 2 is a block diagram of a schematic configuration of a concentration measuring unit in the flue gas purifying device for the diesel engine shown in FIG. 1. As shown in FIG. 1, a vehicle 10 includes a diesel engine 12, an exhaust pipe 14 that guides flue gas discharged from the diesel engine 12, and a flue gas purifying device 16 that purifies flue gas flowing in the exhaust pipe 14. The vehicle 10 also includes various elements required for a vehicle, such as wheels, a body, operating parts, and a transmission, other than constituent elements shown in FIG. 1.

The diesel engine 12 is an internal combustion engine that uses light oil or heavy oil as a fuel, and burns the fuel to extract power. The exhaust pipe 14 is connected to the diesel engine 12 at one end thereof, to guide flue gas discharged from the diesel engine 12.

The flue gas purifying device 16 includes an oxidation catalyst 18, a DPF 20, a urea-water injecting unit 22, a urea water tank 24, a urea SCR unit 26, a concentration measuring unit 28, and a control unit 30, and is arranged in an exhaust path of flue gas, that is, in the exhaust pipe 14 or adjacent to the exhaust pipe 14.

The oxidation catalyst 18 is a catalyst such as platinum provided in the exhaust path of flue gas, specifically, inside of a downstream portion of an exhaust port of the diesel engine 12 in a flow direction of flue gas in the exhaust pipe 14. A part of particulate matters (PM) in flue gas having passed in the exhaust pipe 14 and through the oxidation catalyst 18 is removed by the oxidation catalyst 18. The PM here is an air contaminant discharged from the diesel engine, and is a mixture of solid carbon particles, unburned hydrocarbon (Soluble Organic Fraction: SOF) formed of polymeric molecules, and sulfate generated by oxidation of sulfur contained in the fuel. The oxidation catalyst 18 oxidizes nitrogen monoxide contained in flue gas flowing in the exhaust pipe 14 to nitrogen dioxide.

The DPF (Diesel Particulate Filter) 20 is a filter provided in the exhaust path of flue gas, specifically, inside of a downstream portion of the oxidation catalyst 18 in the exhaust pipe 14, to trap particulate matters contained in flue gas having passed through the oxidation catalyst 18. As the DPF 20, it is desired to use a continuous-regenerative DPF that can maintain the trapping performance such that regeneration is performed by removing trapped PM by burning or the like.

A urea SCR (Selective Catalytic Reduction) system 21 is an NOx removal system that decreases nitrogen oxides (NO, $NO_2$) contained in flue gas, and includes the urea-water injecting unit 22 (hereinafter, simply "injecting unit 22"), the urea water tank 24, and the urea SCR catalytic unit 26. The injecting unit 22 is an injection device that injects urea water into the exhaust pipe 14, and an injection port is provided in a portion on a downstream side to the DPF 20 in the exhaust pipe 14. The injecting unit 22 injects urea water into the exhaust pipe 14 from the injection port. The urea water tank 24 stores urea water, and supplies urea water to the injecting unit 22. A replenishing port for replenishing urea water from an external device that supplies urea water is provided in the urea water tank 24, and urea water is replenished according to need from the replenishing port. The urea SCR catalytic unit 26 includes a urea SCR catalyst, which is a urea selective reduction catalyst that promotes a reaction between ammonia produced from urea with nitrogen oxides, and a support mechanism provided inside of a downstream portion of the injecting unit 22 in the exhaust pipe 14 to support the urea SCR catalyst. Zeolite catalyst can be used as the urea SCR catalyst. Further, the support mechanism is arranged inside the exhaust pipe 14, and a hole for aerating flue gas is formed therein, and the urea SCR catalyst is supported on the surface thereof.

The urea SCR system 21 has the configuration described above, and injects urea water into the exhaust pipe 14 by the injecting unit 22. The injected urea water becomes ammonia ($NH_3$) due to heat in the exhaust pipe 14. Specifically, ammonia is produced from urea water according to the following chemical reaction.

$$(NH_2)2CO + H_2O \rightarrow 2NH_3 + CO_2$$

Thereafter, produced ammonia flows in the exhaust pipe 14 together with flue gas and reaches the urea SCR catalytic unit 26. A part of urea water is not used for producing ammonia and reaches the urea SCR catalytic unit 26 in the state of urea water. Therefore, even in the urea SCR catalytic unit 26, ammonia is produced from urea water according to the reaction mentioned above. Ammonia having reached the urea SCR catalytic unit 26 reacts with nitrogen oxides contained in flue gas to remove oxygen from nitrogen oxides and is reduced to nitrogen. Specifically, nitrogen oxides are reduced according to the following chemical reaction.

$$4NH_3 + 4NO + O_2 \rightarrow 4N_2 + 6H_2O$$

$$4NH_3 + 2NO_2 + O_2 \rightarrow 3N_2 + 6H_2O$$

The concentration measuring unit 28 is arranged in the exhaust pipe 14 on the downstream side of the urea SCR catalytic unit 26 in the exhaust path of flue gas, to measure an ammonia concentration in flue gas having passed through the urea SCR catalytic unit 26. As shown in FIG. 2, the concentration measuring unit 28 includes a measuring unit body 40, an optical fiber 42, a measuring cell 44, and a light receiving unit 46.

The measuring unit body (measuring device body) 40 has a light emitting unit that emits laser beams in a wavelength region absorbed by ammonia, and a computing unit that calculates the ammonia concentration from a signal. The measuring unit body 40 outputs laser beams to the optical fiber 42 and receives a signal received by the light receiving unit 46.

The optical fiber 42 guides laser beams output from the measuring unit body 40 so as to enter into the measuring cell 44.

The measuring cell 44 is arranged in a part of the exhaust pipe 14, and includes an incident unit that causes light emitted from the optical fiber 42 to enter into the measuring cell 44, and an output unit that outputs laser beams having passed through a predetermined route in the measuring cell.

The light receiving unit 46 receives laser beams having passed through the inside of the measuring cell 44 and output from the output unit, and outputs an intensity of received laser beams to the measuring unit body 40 as a light receiving signal.

The concentration measuring unit 28 has the configuration described above, and laser beams output from the measuring unit body 40 pass through the predetermined route in the measuring cell 44 from the optical fiber 42 and is output from the output unit. At this time, if ammonia is contained in flue gas in the measuring cell 44, laser beams passing through the measuring cell 44 are absorbed. Therefore, an output of laser beams reaching the output unit changes according to the ammonia concentration in flue gas. The light receiving unit 46 converts laser beams output from the output unit to a light receiving signal, and outputs the light receiving signal to the measuring unit body 40. The measuring unit body 40 compares the intensity of output laser beams with an intensity calculated from the light receiving signal, to calculate the ammonia concentration in flue gas flowing in the measuring cell 44 based on its rate of diminution. Thus, the concentration measuring unit 28 uses TDLAS (Tunable Diode Laser Absorption Spectroscopy) to calculate or measure the ammonia concentration in flue gas passing through a predetermined position in the measuring cell 44, that is, a measurement position based on the intensity of output laser beams and the light receiving signal detected by the light receiving unit 46. Further, the concentration measuring unit 28 according to the present embodiment can continuously calculate or measure the ammonia concentration.

Only the incident unit and the output unit of the measuring cell 44 can be made of a light transmitting material, or the measuring cell 44 on the whole can be made of the light transmitting material. Further, at least two optical mirrors can be provided in the measuring cell 44, so that laser beams entering from the incident unit is multiply-reflected by the optical mirrors and output from the output unit. By multiply-reflecting laser beams, laser beams can pass through more regions in the measuring cell 44. Accordingly, an influence of concentration distribution on flue gas flowing in the measuring cell 44 can be decreased, thereby enabling accurate detection of concentrations.

The control unit 30 controls the amount of urea water to be injected from the injecting unit 22 and an injection timing according to PID control based on a detection result of the concentration measuring unit 28. Specifically, when the ammonia concentration is lower than a predetermined value, the amount of urea water to be injected at a time is increased or an injection interval of urea water is decreased. When the ammonia concentration is higher than the predetermined value, the amount of urea water to be injected at a time is decreased or the injection interval of urea water is increased.

Figure 3:
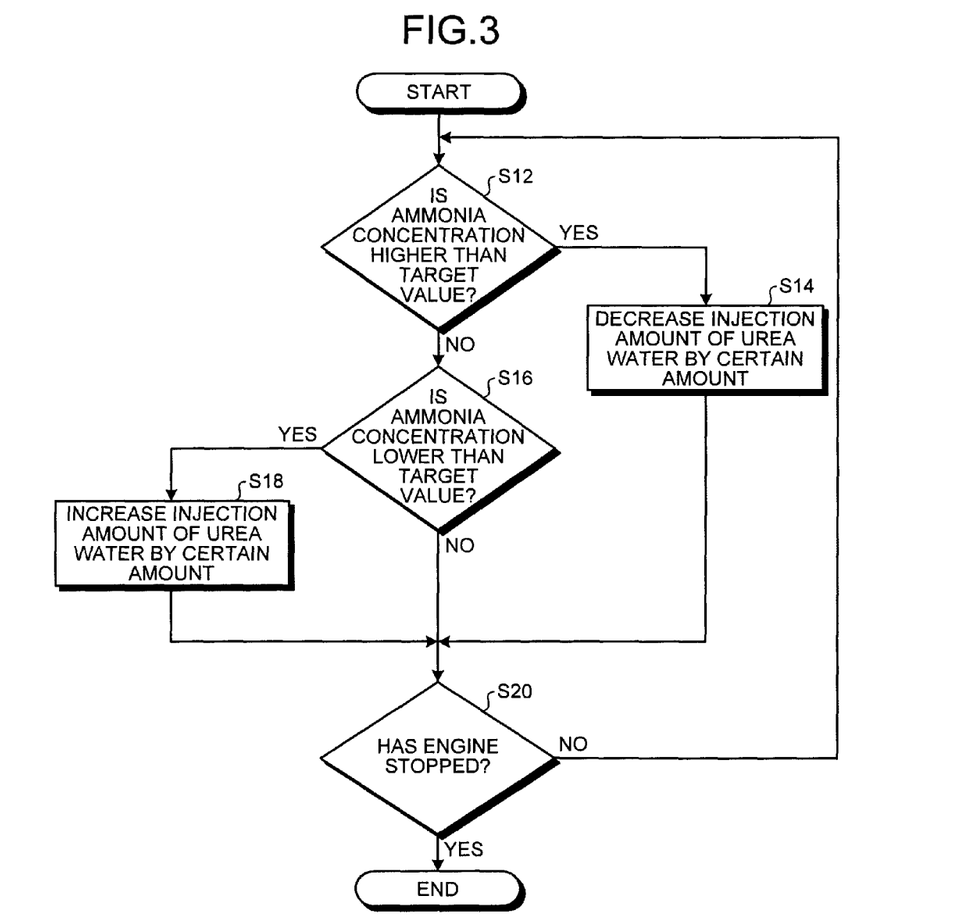
FIG. 3 is a flowchart of an example of a control method of an injection amount of urea water performed by a control unit.

FIG. 3 is a flowchart of an example of a control method of the injection amount of urea water performed by the control unit 30. The flowchart shown in FIG. 3 is performed when the ammonia concentration is adjusted according to the amount of urea water injected from the injecting unit 22. When the ammonia concentration measured by the concentration measuring unit 28 is input to the control unit 30, the control unit 30 determines whether the measured ammonia concentration is higher than a target value at Step S12. When having determined that the ammonia concentration measured at Step S12 is higher than the target value (YES), the control unit 30 proceeds to Step S14 to decrease the currently set injection amount of urea water by a certain amount. That is, the control unit 30 decreases the amount of urea water to be injected from the injecting unit 22 by a certain amount. The control unit 30 then proceeds to Step S20.

When having determined that the measured ammonia concentration is lower than the target value at Step S12 (NO), the control unit 30 proceeds to Step S16 to determine whether the measured ammonia concentration is lower than the target value. When having determined that the ammonia concentration measured at Step S16 is lower than the target value (YES), the control unit 30 proceeds to Step S18 to increase the currently set injection amount of urea water by a certain amount. That is, the control unit 30 increases the amount of urea water to be injected from the injecting unit 22 by a certain amount. The control unit 30 then proceeds to Step S20. When having determined that the ammonia concentration measured at Step S16 is higher than the target value (NO), the control unit 30 proceeds to Step S20. The control unit 30 determines whether the engine (the diesel engine 12) has stopped at Step S20. When having determined that the engine has not stopped, that is, the engine is being operated (NO), the control unit 30 proceeds to Step S12 to repeat the above process.

When having determined that the engine has stopped at Step S20 (YES), the control unit 30 finishes the process. The control unit 30 controls the injection amount of urea water by the injecting unit 22 in this manner. In the control, the injection amount of urea water is increased or decreased by a certain amount; however, the control is not limited thereto. For example, when the ammonia concentration is lower than the target value, the injection amount of urea water can be a preset reference value, or when the ammonia concentration is higher than the target value, the injection amount of urea water can be set to 0. The injection amount of urea water can be adjusted by the number of injections or can be adjusted by one injection amount. An upper limit target value and a lower limit target value of the ammonia concentration can be different values. That is, the target value to be used at Step S12 and the target value to be used at Step S16 can be different. By setting the upper limit target value and the lower limit target value of the ammonia concentration to different values, an ammonia concentration range that does not change the injection amount of urea water can be set to a certain concentration range.

The vehicle 10 and the flue gas purifying device 16 have basically the configuration as described above. The flue gas purifying device 16 traps the PM contained in flue gas and decreases the PM in flue gas, by causing flue gas discharged from the diesel engine 12 to pass through the oxidation catalyst 18 and the DPF 20. Flue gas having passed through the DPF 20 flows in the exhaust pipe 14, and after urea water is injected from the injecting unit 22, flue gas passes through the urea SCR catalytic unit 26 together with urea water and ammonia produced from urea water. Because flue gas passes through the urea SCR catalytic unit 26 together with ammonia, nitrogen oxides contained in flue gas are decreased by the urea SCR system 21. Thereafter, flue gas is discharged to the air from the exhaust pipe 14. As described above, the flue gas purifying device 16 controls the amount of urea water injected by the injecting unit 22 and the injection timing based on a measurement result obtained by measuring the ammonia concentration in flue gas, which has passed through the urea SCR catalytic unit 26, by the concentration measuring unit 28.

As described above, the vehicle 10 can decrease the PM in flue gas discharged from the diesel engine 12, reduce nitrogen oxides, and discharge flue gas in a state with harmful substances being decreased, by the flue gas purifying device 16.

Further, the flue gas purifying device 16 measures the ammonia concentration having passed through the urea SCR catalytic unit 26 to control the injection amount of urea water according to the result thereof. In this manner, by controlling the injection amount of urea water based on the ammonia concentration having passed through the urea SCR catalytic unit 26, the injection amount of urea water can be controlled according to the reaction state between ammonia and nitrogen oxides.

Figure 4A:
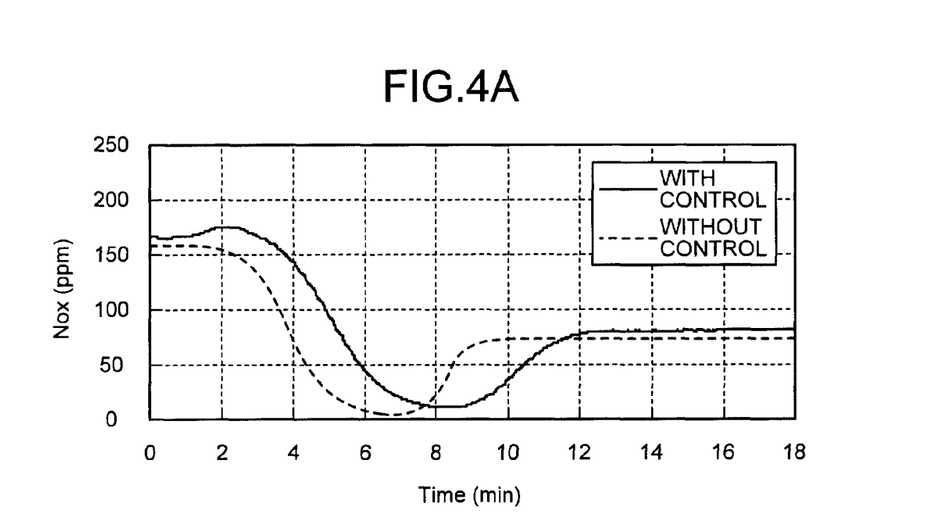
FIG. 4A is a graph of a relation between a concentration of nitrogen oxides (NOx) and a time.
Figure 4B:
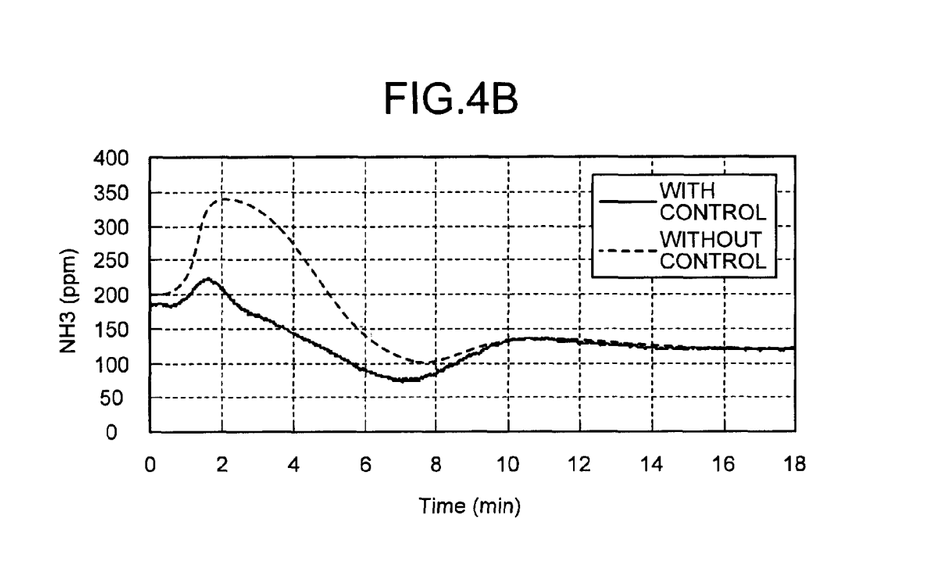
FIG. 4B is a graph of a relation between a measured ammonia concentration and a time.
Figure 4C:
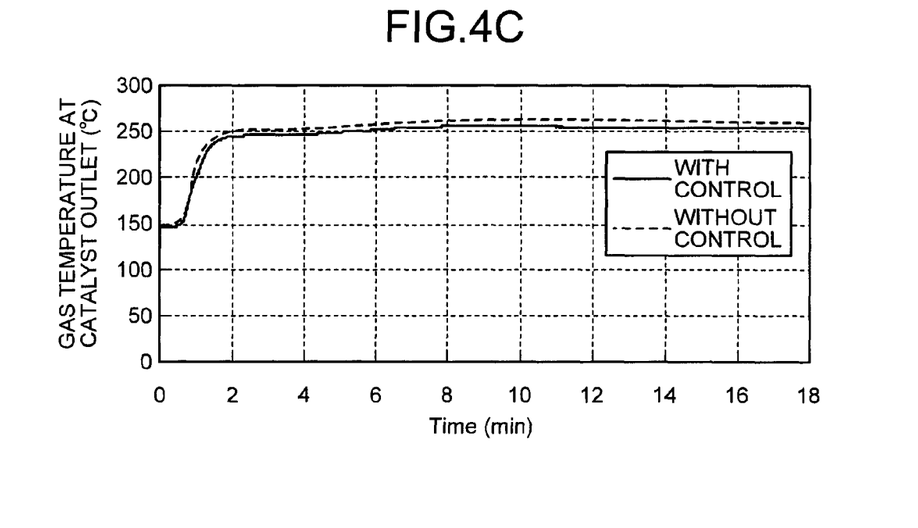
FIG. 4C is a graph of a relation between a temperature of a urea SCR catalyst and a time.
Figure 4D:
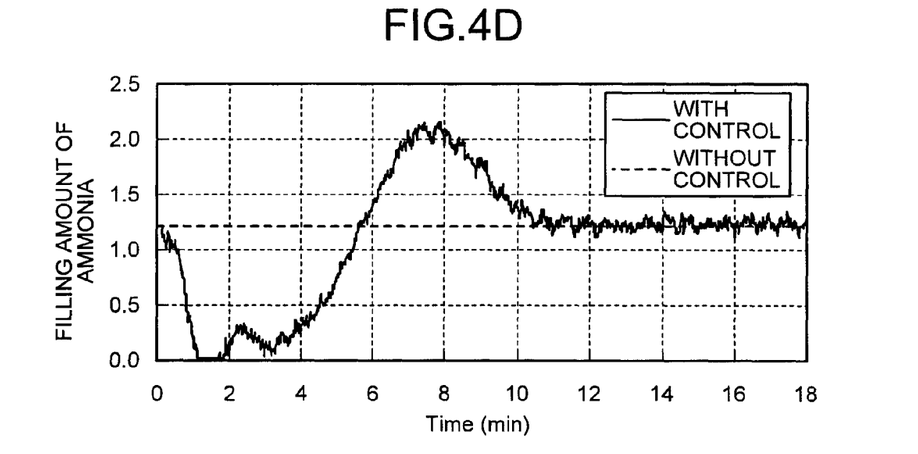
FIG. 4D is a graph of a relation between an amount of ammonia filled in urea SCR and a time.

A measurement example is specifically explained below in detail. In this measurement example, a flue gas processing capacity was changed by changing the temperature of the urea SCR catalyst. In this case, a change in the ammonia temperature, a change in the concentration of nitrogen oxides, and a change in a filling amount of ammonia were measured until a measurement value of ammonia concentration reached a target value, that is, a steady state by controlling a filling amount of ammonia based on the ammonia concentration. The filling amount of ammonia corresponds to an injection amount of urea water. For comparison, a change in the ammonia temperature, a change in the concentration of nitrogen oxides, and a change in the filling amount of ammonia when control according to ammonia concentration was not performed and the filling amount of ammonia was constant were measured. Measurement results are shown in FIGS. 4A to 4D. FIG. 4A is a graph of a relation between a concentration of nitrogen oxides (NOx) and a time, FIG. 4B is a graph of a relation between a measured ammonia concentration and a time, FIG. 4C is a graph of a relation between a temperature of a urea SCR catalyst and a time, and FIG. 4D is a graph of a relation between an amount of ammonia filled in urea SCR and a time. The time axes in the graphs in FIGS. 4A to 4D are the same time axis, and the target value of the ammonia concentration is set to 125 ppm.

As shown in FIGS. 4A to 4D, it is understood that when the ammonia concentration becomes higher than the target value, the filling amount of ammonia is decreased, and when the ammonia concentration becomes lower than the target value, the filling amount of ammonia is increased. It is also understood that by controlling the filling amount of ammonia according to the ammonia concentration, it can be prevented that the amount of ammonia contained in flue gas changes abruptly, thereby enabling to decrease the leakage of ammonia than in the case that the filling amount of ammonia is constant. Specifically, it is understood that an ammonia slip integrated value can be decreased by 50% to 67% than in the case that the filling amount of ammonia is constant. The effect of the present invention is obvious from the above explanations.

A reaction amount between nitrogen oxides and ammonia and an adsorption rate of ammonia change according to a plurality of factors such as a temperature and a concentration. Therefore, even if the urea SCR catalytic unit 26 controls the injection amount of urea water based on a map created beforehand, the amount of ammonia may increase and leak, or ammonia is not sufficient, and thus nitrogen oxides cannot be completely reduced and nitrogen oxides may leak. However, by measuring the ammonia concentration in flue gas having passed through the urea SCR catalyst, the injection amount of urea water can be controlled more appropriately. Further, because only one sensor that can control the injection amount of urea water based on only the ammonia concentration needs to be provided, the device configuration can be simplified.

The flue gas purifying device 16 can suppress leakage of ammonia as described above. However, it is desired that an oxidation catalyst that oxidizes ammonia is provided on a downstream side of the urea SCR catalytic unit 26, in order to further decrease ammonia leaking to the air. Even if the oxidation catalyst is provided, the oxidation catalyst can be made smaller than the conventional one, because the flue gas purifying device 16 can decrease the leakage of ammonia. Accordingly, the device configuration of the flue gas purifying device can be further simplified, and the weight thereof can be decreased. Further, nitrogen oxides generated due to oxidation of ammonia can be decreased.

Further, the control unit 30 can change the target value of the ammonia concentration at a measurement position according to operating conditions such as accelerator opening, velocity, and engine speed, or can set it constant regardless of the operating conditions. When changing the target value according to the operating conditions, the control unit 30 can control the injection amount of urea water corresponding to an increase or decrease of the amount of nitrogen oxides contained in flue gas, thereby enabling to decrease nitrogen oxides more appropriately, and maintain the ammonia concentration at the measurement position at a value close to the target value. The same effects can be obtained when the target value is maintained constant to control the injection amount and the injection timing of urea water based on a relation between the target value and the operating conditions. When the target value of the ammonia concentration is set constant regardless of the operating conditions, the operating conditions do not need to be detected, thereby enabling to decrease the number of measuring units, and simplify the device configuration of the flue gas purifying device. Further, because the target value does not need to be calculated according to conditions, control is simplified.

By using zeolitic metal as the urea SCR catalyst, the urea SCR catalyst can function appropriately as a catalyst even under a high-temperature condition discharged from the internal combustion engine or the like. Ammonia adsorption on Zeolite is large and changes according to the temperature. Therefore, control by using a map or the like is difficult. However, as in the present invention, by a measuring ammonia concentration in flue gas having passed through the urea SCR catalytic unit 26, and controlling the injection amount of urea water based on the measurement result, leakage of ammonia can be suppressed even in the case of using zeolitic metal as the urea SCR catalyst.

In the flue gas purifying device 16, PM is trapped by the oxidation catalyst 18 and the DPF 20, to decrease the PM in flue gas; however, the present invention is not limited thereto. Various types of particulate-matter decreasing apparatuses that decrease PM can be used for the flue gas purifying device, and for example, only a filter for trapping PM can be arranged without providing the oxidation catalyst.

In the flue gas purifying device 16, ammonia can be measured continuously without detecting nitrogen oxides. Therefore, the concentration measuring unit 28 uses the TDLAS method in which laser beams in a wavelength region absorbed by ammonia are output and an absorption rate of laser beams is detected, to measure the ammonia concentration. However, the present invention is not limited thereto. Various measuring units that can measure the ammonia concentration in flue gas can be used in the present invention. For example, a branch pipe can be provided at the measurement position, so that a part of flue gas is made to flow into the branch pipe to measure the ammonia concentration in flue gas flowing in the branch pipe.

In the flue gas purifying device 16, further, only the concentration measuring unit 28 is provided to control the injection amount of urea water based on only the ammonia concentration in flue gas having passed through the urea SCR catalytic unit 26; however, the present invention is not limited thereto. A flue gas purifying device according to another embodiment of the present invention is explained below with reference to FIG. 5.

Figure 5:
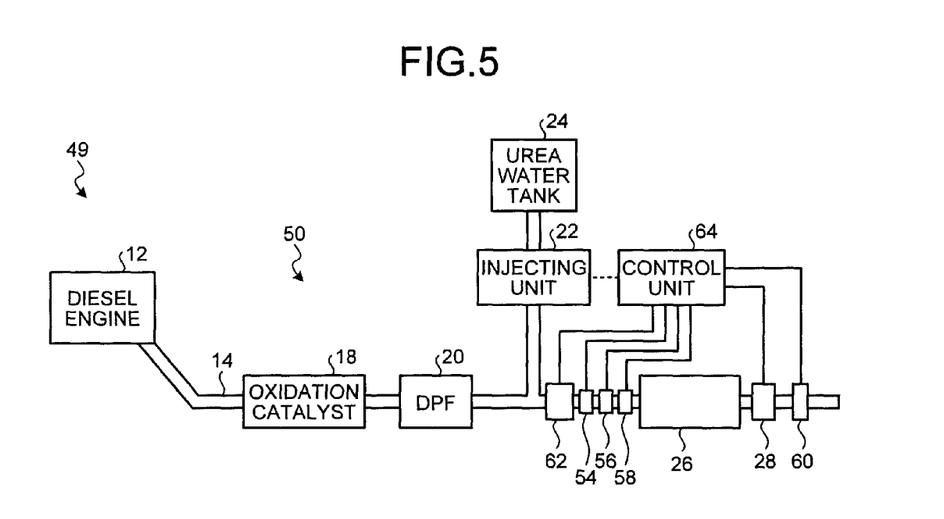
FIG. 5 is a block diagram of a schematic configuration of a vehicle having a flue gas purifying device according to another embodiment of the present invention.

FIG. 5 is a block diagram of a schematic configuration of a vehicle having the flue gas purifying device according to another embodiment of the present invention. A vehicle 49 shown in FIG. 5 has the same configuration as that of the vehicle 10, except for a part of a flue gas purifying device 50 and therefore explanations of constituent elements identical to those of the vehicle 10 will be omitted, and features specific to the vehicle 49 are mainly explained below. The vehicle 49 shown in FIG. 5 includes the diesel engine 12, the exhaust pipe 14, and the flue gas purifying device 50. The flue gas purifying device 50 includes the oxidation catalyst 18, the DPF 20, the injecting unit 22, the urea water tank 24, the urea SCR catalytic unit 26, the concentration measuring unit 28, a pretreatment ammonia-concentration measuring unit 54, an isocyanic-acid-concentration measuring unit 56, a pretreatment nitrogen-oxide-concentration measuring unit 58, a treated nitrogen-oxide-concentration measuring unit 60, a temperature adjusting unit 62, and a control unit 64. The oxidation catalyst 18, the DPF 20, the injecting unit 22, the urea water tank 24, the urea SCR catalytic unit 26, and the concentration measuring unit 28 respectively have the same configuration as those of the flue gas purifying device 16 described above, and thus detailed explanations thereof will be omitted.

The pretreatment ammonia-concentration measuring unit 54 is arranged in the exhaust pipe 14 on an upstream side of the urea SCR catalytic unit 26, specifically, on a downstream side of the DPF 20 and the injecting unit 22 and an upstream side of the urea SCR catalytic unit 26 in an exhaust path of flue gas, to measure an ammonia concentration in flue gas supplied to the urea SCR catalytic unit 26. The pretreatment ammonia-concentration measuring unit 54 includes a measuring unit body, an optical fiber, a measuring cell, and a light receiving unit as in the concentration measuring unit 28. Because a measurement method of an ammonia concentration by the pretreatment ammonia-concentration measuring unit 54 is the same as that by the concentration measuring unit 28, explanations thereof will be omitted. The pretreatment ammonia-concentration measuring unit 54 continuously measures the concentration of ammonia contained in flue gas before passing through the urea SCR catalytic unit 26, and transmits a measurement result to the control unit 64.

The isocyanic-acid-concentration measuring unit 56 is arranged on the upstream side of the urea SCR catalytic unit 26 in the exhaust path of flue gas, to measure the concentration of isocyanic acid in flue gas supplied to the urea SCR catalytic unit 26. A sensor having the same configuration as that of the concentration measuring unit 28 can be used as the isocyanic-acid-concentration measuring unit 56. Specifically, the isocyanic-acid-concentration measuring unit 56 causes a light emitting unit to emit laser beams in a wavelength region absorbed by isocyanic acid, and receives light emitted from the light emitting unit and having passed through flue gas by a light receiving unit, thereby enabling to detect the concentration of isocyanic acid in flue gas based on the intensity of received light. The isocyanic-acid-concentration measuring unit 56 continuously measures the concentration of isocyanic acid contained in flue gas before passing through the urea SCR catalytic unit 26, and transmits a measurement result to the control unit 64. Various sensors such as a sensor that detects only isocyanic acid without detecting nitrogen oxides and ammonia in flue gas and measures the concentration thereof can be used as the isocyanic-acid-concentration measuring unit.

The pretreatment nitrogen-oxide-concentration measuring unit 58 is arranged on the upstream side of the urea SCR catalytic unit 26 in the exhaust path of flue gas, to measure the concentration of nitrogen oxides in flue gas supplied to the urea SCR catalytic unit 26. A sensor having the same configuration as that of the concentration measuring unit 28 can be used as the pretreatment nitrogen-oxide-concentration measuring unit 58, as in the isocyanic-acid-concentration measuring unit 56. Specifically, the pretreatment nitrogen-oxide-concentration measuring unit 58 causes a light emitting unit to emit laser beams in the wavelength region absorbed by nitrogen oxides, and receives light emitted from the light emitting unit and having passed through flue gas by a light receiving unit, thereby enabling to detect the concentration of nitrogen oxides in flue gas based on the intensity of received light. The pretreatment nitrogen-oxide-concentration measuring unit 58 continuously measures the concentration of nitrogen oxides contained in flue gas before passing through the urea SCR catalytic unit 26, and transmits a measurement result to the control unit 64. Various sensors such as a sensor that detects only nitrogen oxides without detecting isocyanic acid and ammonia in flue gas and measures the concentration thereof can be used as the nitrogen-oxides-concentration measuring unit.

The treated nitrogen-oxide-concentration measuring unit 60 is arranged in the exhaust pipe 14 on the downstream side of the urea SCR catalytic unit 26 in the exhaust path of flue gas, to measure the concentration of nitrogen oxides in flue gas having passed through the urea SCR catalytic unit 26. A sensor having the same configuration as that of the pretreatment nitrogen-oxide-concentration measuring unit 58 can be used as the treated nitrogen-oxide-concentration measuring unit 60. The treated nitrogen-oxide-concentration measuring unit 60 continuously measures the concentration of nitrogen oxides contained in flue gas having passed through the urea SCR catalytic unit 26 and transmits a measurement result to the control unit 64.

The temperature adjusting unit 62 is provided in the exhaust pipe 14 on the upstream side of the urea SCR catalytic unit 26 in the exhaust path of flue gas, specifically, in the exhaust pipe 14 between the injecting unit 22 and the urea SCR catalytic unit 26, to adjust the temperature of flue gas flowing in the exhaust pipe 14. The temperature adjusting unit 62 heats or cools flue gas flowing in the exhaust pipe 14 by heating or cooling the exhaust pipe 14, to adjust the temperature of flue gas. Various heating mechanisms and cooling mechanisms such as a heater, a Peltier element, an air-cooling device, and the like can be used as the temperature adjusting unit 62.

The control unit 64 adjusts the injection amount of urea water by the injecting unit 22 based on the measurement results transmitted from the concentration measuring unit 28, the pretreatment nitrogen-oxide-concentration measuring unit 58, and the treated nitrogen-oxide-concentration measuring unit 60, and adjusts the temperature of flue gas by the temperature adjusting unit 62 based on the measurement results transmitted from the pretreatment ammonia-concentration measuring unit 54 and the isocyanic-acid-concentration measuring unit 56.

Figure 6:
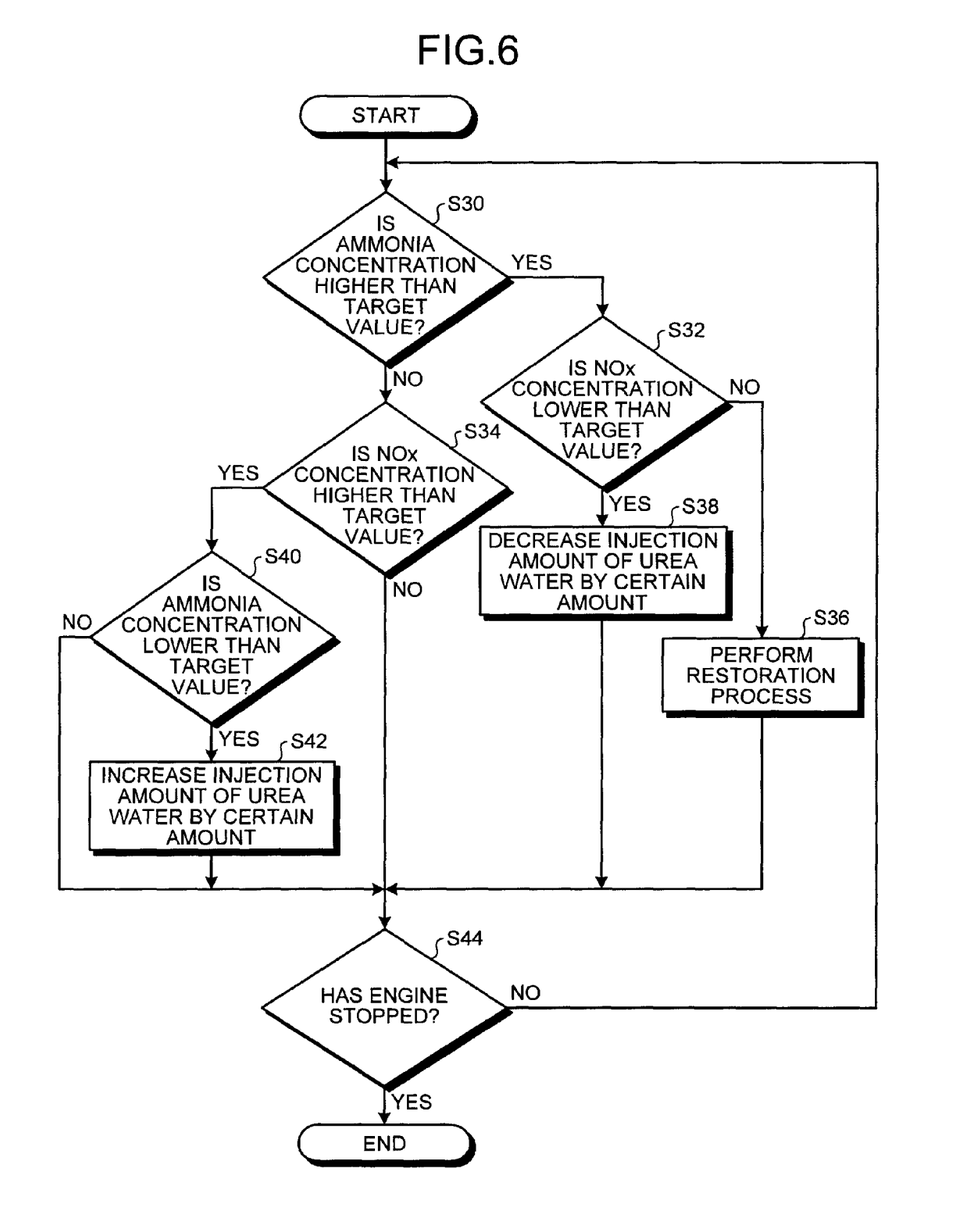
FIG. 6 is a flowchart of an example of a control method of an injection amount of urea water performed by a control unit.

Adjustment of the injection amount of urea water performed by the control unit 64 is explained first. The control unit 64 sets the injection amount of urea water so that the ammonia concentration in flue gas having passed through the urea SCR catalytic unit 26 transmitted from the concentration measuring unit 28 becomes equal to or lower than the target value and the concentration of nitrogen oxides in flue gas having passed through the urea SCR catalytic unit 26 transmitted from the treated nitrogen-oxide-concentration measuring unit 60 becomes equal to or lower than the target value. Further, the control unit 64 calculates an amount of ammonia required for purifying nitrogen oxides contained in flue gas based on the concentration of nitrogen oxides in flue gas before passing through the urea SCR catalytic unit 26 transmitted from the pretreatment nitrogen-oxide-concentration measuring unit 58. An example of a control method is explained below in detail with reference to FIG. 6. FIG. 6 is a flowchart of an example of the control method of the injection amount of urea water performed by the control unit 64. In the flowchart shown in FIG. 6, a control method for controlling the injection amount of urea water so that the ammonia concentration and the concentration of nitrogen oxides in flue gas having passed through the urea SCR catalytic unit 26 become adequate is shown, in which it is not taken into consideration to control the injection amount of urea water based on the concentration of nitrogen oxides in flue gas before passing through the urea SCR catalytic unit 26.

First, when the ammonia concentration measured by the concentration measuring unit 28 and the concentration of nitrogen oxides (NOx) measured by the treated nitrogen-oxide-concentration measuring unit 60 are input to the control unit 64, the control unit 64 determines whether the measured ammonia concentration is higher than the target value at Step S30. When having determined that the ammonia concentration measured at Step S30 is higher than the target value (YES), the control unit 64 proceeds to Step S32 to determine whether the measured concentration of nitrogen oxides (NOx) is lower than the target value.

When having determined that the measured concentration of nitrogen oxides (NOx) is lower than the target value (YES) at Step S32, the control unit 64 decreases the currently set injection amount of urea water by a certain amount at Step S38. That is, the control unit 64 decreases the amount of urea water to be injected from the injecting unit 22 by a certain amount. The control unit 64 then proceeds to Step S44. When having determined that the measured concentration of nitrogen oxide (NOx) is equal to or higher than the target value (NO) at Step S32, the control unit 64 performs a restoration process at Step S36, and proceeds to Step S44. The restoration process is for restoring catalytic power of the urea SCR catalytic unit 26, and for example, for heating the urea SCR catalyst of the urea SCR catalytic unit 26. For example, a heater can be used as a heating unit that heats the urea SCR catalyst. Further, the control unit can change combustion conditions of the diesel engine 12 to raise the temperature of flue gas. Thus, when both of the ammonia concentration and the concentration of nitrogen oxides are equal to or higher than the target values, the control unit determines that the catalytic power of the urea SCR catalytic unit 26 deteriorates and a reaction between ammonia and nitrogen oxides does not occur appropriately, and performs the restoration process, so that the reaction between ammonia and nitrogen oxides is caused preferably by the urea SCR catalytic unit 26.

Next, when having determined that the ammonia concentration measured at Step S30 is equal to or lower than the target value (NO), the control unit 64 determines whether the concentration of nitrogen oxides (NOx) is higher than the target value at Step S34. When having determined that the concentration of nitrogen oxides is higher than the target value (YES) at Step S34, the control unit 64 proceeds to Step S40 to determine whether the ammonia concentration is lower than the target value. When having determined that the concentration of nitrogen oxides is equal to or lower than the target value (NO) at Step S34, because the concentration of nitrogen oxides and the ammonia concentration are both equal to or lower than the target values, the control unit 64 proceeds to Step S44 without adjusting the injection amount of urea water. When having determined that the ammonia concentration is lower than the target value (YES) at Step S40, the control unit 64 proceeds to Step S42 to increase the currently set injection amount of urea water by a certain amount. That is, the control unit 64 increases an amount of urea water to be injected from the injecting unit 22 by a certain amount. The control unit 64 then proceeds to Step S44. When having determined that the ammonia concentration is equal to or higher than the target value (NO) at Step S40, the control unit 64 proceeds to Step S44. When the ammonia concentration is equal to or higher than the target value at Step S40, the amount of ammonia is not increased even if the concentration of nitrogen oxides is equal to or higher than the target value, thereby enabling to decrease ammonia in flue gas discharged from the exhaust pipe 14.

The control unit 64 determines whether the engine (the diesel engine 12) has stopped at Step S44. When having determined that the engine has not stopped, that is, the engine is being operated (NO), the control unit 64 proceeds to Step S30 to repeat the above process. When having determined that the engine has stopped (YES) at Step S44, the control unit 64 finishes the process. The control unit 64 controls the injection amount of urea water by the injecting unit 22 in this manner. In the control, the injection amount of urea water is increased or decreased by a certain amount; however, the control is not limited thereto, as in the control described above. The upper limit target value and the lower limit target value of the ammonia concentration can be different values. In the control, the restoration process is performed at Step S36; however, an informing unit can inform a user that the urea SCR catalyst in the urea SCR catalytic unit 26 needs to be replaced. A display that displays a message or a sound output device that informs by sound can be used as the informing unit.

Further, in the present embodiment, the concentration of nitrogen oxides measured by the pretreatment nitrogen-oxide-concentration measuring unit 58 is not used. However, an amount of ammonia required for purifying (neutralizing) nitrogen oxides in flue gas can be calculated from the concentration of nitrogen oxides in flue gas before passing through the urea SCR catalytic unit 26 to correct the injection amount of urea water calculated based on the ammonia concentration and the concentration of nitrogen oxides in flue gas after having passed through the urea SCR catalytic unit 26 by the control unit 64. Further, the injection amount of urea water can be calculated from the ammonia concentration in flue gas after having passed through the urea SCR catalytic unit 26 without using the concentration of nitrogen oxides in flue gas after having passed through the urea SCR catalytic unit 26, and the calculated injection amount of urea water can be corrected based on the amount of ammonia required for purifying (neutralizing) nitrogen oxides in flue gas, calculated based on the concentration of nitrogen oxides in flue gas before passing through the urea SCR catalytic unit 26.

A method of adjusting the temperature of flue gas performed by the temperature adjusting unit 62 based on the measurement results transmitted from the pretreatment ammonia-concentration measuring unit 54 and the isocyanic-acid-concentration measuring unit 56 is explained next. In urea water injected from the injecting unit 22, isocyanic acid is produced from urea, and ammonia is produced from isocyanic acid due to heat of the exhaust pipe 14 and heat of flue gas. However, if the reaction is not adequate, a part of urea water is maintained in the state of urea or in the state of isocyanic acid, so as not to produce ammonia. To solve this problem, the control unit 64 determines whether injected urea water is appropriately turned into ammonia based on at least one of the ammonia concentration and the concentration of isocyanic acid in flue gas before passing through the urea SCR catalytic unit 26, transmitted from the pretreatment ammonia-concentration measuring unit 54 and the isocyanic-acid-concentration measuring unit 56. Specifically, when the concentration of isocyanic acid is equal to or higher than a certain level, the control unit 64 determines that the reaction does not occur appropriately. When a theoretical ammonia concentration is calculated from the injection amount of urea water and a measurement value acquired by the pretreatment ammonia-concentration measuring unit 54 is lower than the calculated value by a certain concentration, the control unit 64 determines that the reaction does not occur appropriately. When having determined that the reaction does not occur appropriately and urea water and isocyanic acid remain in flue gas, the control unit 64 causes the temperature adjusting unit 62 to raise the temperature of the flue gas to promote production of ammonia from urea water and isocyanic acid, so that ammonia is produced when the flue gas reaches the urea SCR catalytic unit 26.

The flue gas purifying device 50 has the configuration described above, and flue gas discharged from the diesel engine 12 flows in the exhaust pipe 14, and passes through the oxidation catalyst 18 and the DPF 20 to decrease PM. Thereafter, the flue gas further flows in the exhaust pipe 14, and after urea water is injected from the injecting unit 22, flows in a region of the exhaust pipe 14 where the temperature adjusting unit 62 is arranged. The flue gas then flows in a region of the exhaust pipe 14 where the pretreatment ammonia-concentration measuring unit 54, the isocyanic-acid-concentration measuring unit 56, and the pretreatment nitrogen-oxide-concentration measuring unit 58 are arranged. At that time, the respective concentration detecting units respectively measure the concentration of a substance to be measured in the flue gas. Thereafter, the flue gas passes through the urea SCR catalytic unit 26, flows in the region of the exhaust pipe 14 where the concentration measuring unit 28 and the treated nitrogen-oxide-concentration measuring unit 60 are arranged, and is discharged to the outside. While the flue gas passes through the urea SCR catalyst, nitrogen oxides contained in the flue gas and ammonia produced from urea water reacts with each other to reduce nitrogen oxides. The respective concentration detecting units measure the concentration of a substance to be measured in the flue gas.

The flue gas purifying device 50 can further decrease nitrogen oxides in flue gas, while suppressing leakage of ammonia, by adjusting the injection amount of urea water by the injecting unit 22 based on the measurement results acquired by the pretreatment nitrogen-oxide-concentration measuring unit 58 and the treated nitrogen-oxide-concentration measuring unit 60, in addition to the measurement result acquired by the concentration measuring unit 28. Further, the flue gas purifying device 50 can produce ammonia adequately from urea water and adequately cause a reaction between ammonia and nitrogen oxides by adjusting the temperature of flue gas by the temperature adjusting unit 62, based on the measurement results acquired by the pretreatment ammonia-concentration measuring unit 54 and the isocyanic-acid-concentration measuring unit 56.

In the present embodiment, the concentration measuring unit 28, the pretreatment nitrogen-oxide-concentration measuring unit 58, the treated nitrogen-oxide-concentration measuring unit 60, the pretreatment ammonia-concentration measuring unit 54, and the isocyanic-acid-concentration measuring unit 56 are used. However, at least the concentration measuring unit 28 needs only to be used, and other sensors can be appropriately combined and used. The effects described above can be obtained by adjusting the injection amount of urea water, or the injection amount of urea water and the temperature of flue gas based on the measurement results acquired by the concentration measuring unit 28 and the respective sensors.

Furthermore, in the present embodiment, the temperature adjusting unit is provided separately. However, the present invention is not limited thereto, and when the temperature of flue gas can be adjusted by an internal combustion engine such as a diesel engine, the internal combustion engine can be used as the temperature adjusting unit to adjust the temperature of flue gas.

It is desired that the flue gas purifying device further includes a temperature detecting unit that detects the temperature of the urea SCR catalyst, stores a history of the temperature of the urea SCR catalyst and the measurement results acquired by the respective measuring units, calculates the amount of ammonia adsorbed on the urea SCR catalyst to calculate the amount of ammonia required for purifying nitrogen oxides in flue gas based on the calculated amount of ammonia, and injects urea water based on the calculated amount of ammonia. Thus, by controlling the injection amount of urea water, taking the amount of ammonia adsorbed on the urea SCR catalyst into consideration, the amount of ammonia adsorbed on the urea SCR catalyst can be made an amount with which the reaction between ammonia and nitrogen oxides can be caused highly efficiently by the urea SCR catalyst. Accordingly, the amount of ammonia leaking from the exhaust pipe can be further decreased. Because the reaction between ammonia and nitrogen oxides can be caused highly efficiently by the urea SCR catalyst, the size of the urea SCR catalyst can be reduced.

Figure 7:
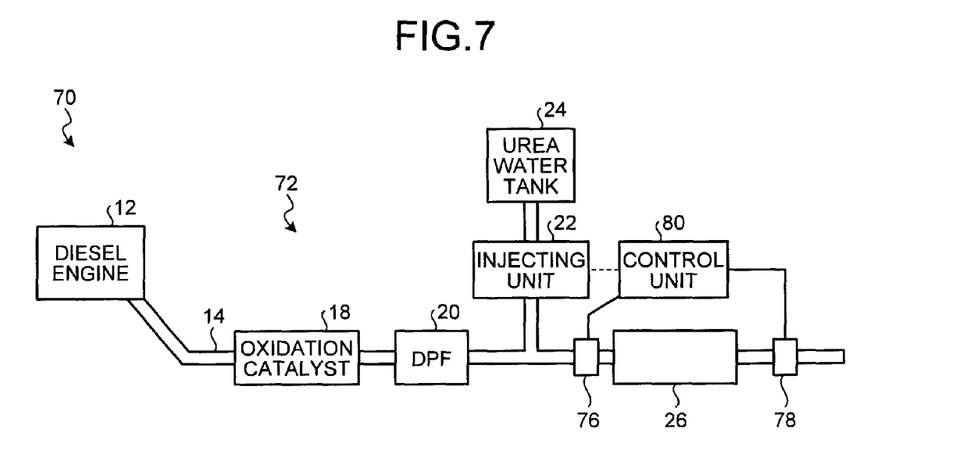
FIG. 7 is a block diagram of a schematic configuration of a vehicle having a flue gas purifying device according to another embodiment of the present invention.

In the flue gas purifying device described above, the ammonia concentration in flue gas having passed through the urea SCR catalytic unit is detected by the concentration measuring unit 28. However, the present invention is not limited thereto, and the ammonia concentration can be calculated from the concentration of nitrogen oxides detected by a pretreatment nitrogen-oxides-concentration detecting unit and a treated nitrogen-oxides-concentration detecting unit. This is explained in detail with reference to FIG. 7. FIG. 7 is a block diagram of a schematic configuration of a vehicle having the flue gas purifying device according to another embodiment of the present invention. A vehicle 49 shown in FIG. 5 has the same configuration as that of the vehicle 10, except for a part of a flue gas purifying device 50, and therefore explanations of constituent elements identical to those of the vehicle 10 will be omitted, and features specific to the vehicle 49 are mainly explained below.

The vehicle 70 shown in FIG. 7 includes the diesel engine 12, the exhaust pipe 14, and the flue gas purifying device 72. The flue gas purifying device 72 includes the oxidation catalyst 18, the DPF 20, the injecting unit 22, the urea water tank 24, the urea SCR catalytic unit 26, a pretreatment nitrogen-oxide-concentration measuring unit 76, a treated nitrogen-oxide-concentration measuring unit 78, and a control unit 80. The oxidation catalyst 18, the DPF 20, the injecting unit 22, the urea water tank 24, and the urea SCR catalytic unit 26 respectively have the same configuration as those of the flue gas purifying device 16 described above, and thus detailed explanations thereof will be omitted.

The pretreatment nitrogen-oxide-concentration measuring unit 76 is arranged on an upstream side of the urea SCR catalytic unit 26 in the exhaust path of flue gas, to measure the concentration of nitrogen oxides in flue gas supplied to the urea SCR catalytic unit 26. The pretreatment nitrogen-oxide-concentration measuring unit 76 is a measuring unit same as the pretreatment nitrogen-oxide-concentration measuring unit 58 shown in FIG. 5.

The treated nitrogen-oxide-concentration measuring unit 78 is arranged in the exhaust pipe 14 on a downstream side of the urea SCR catalytic unit 26 in the exhaust path of flue gas, to measure the concentration of nitrogen oxides in flue gas having passed through the urea SCR catalytic unit 26. The treated nitrogen-oxide-concentration measuring unit 78 is a measuring unit same as the treated nitrogen-oxide-concentration measuring unit 60.

The control unit 80 calculates an amount of reacted ammonia based on the concentration of nitrogen oxides in flue gas before passing through the urea SCR catalytic unit 26 detected by the pretreatment nitrogen-oxide-concentration measuring unit 76 and the concentration of nitrogen oxides in flue gas after having passed through the urea SCR catalytic unit 26 detected by the treated nitrogen-oxide-concentration measuring unit 78, to calculate the concentration of ammonia contained in flue gas having passed through the urea SCR catalytic unit 26. The control unit 80 controls the injection amount of urea water based on the calculated ammonia concentration according to the same method as that performed by the control unit 30 in the flue gas purifying device 16. By calculating the ammonia concentration in flue gas having passed through the urea SCR catalytic unit 26 from the concentration of nitrogen oxides in flue gas as in the flue gas purifying device 72, the injection amount of urea water can be controlled without directly measuring the ammonia concentration. As described above, because the amount of ammonia to be adsorbed changes according to the temperature or the like, measurement accuracy decreases than the case of directly measuring the ammonia concentration. Therefore, the effect of suppressing ammonia leakage from the exhaust pipe is lower than that of the respective flue gas purifying devices described above.

Industrial Applicability

As described above, the flue gas purifying device according to the present invention is useful for purifying flue gas discharged from an internal combustion engine, and the flue gas purifying device is particularly suitable for purifying flue gas discharged from a diesel engine mounted on a vehicle.

Reference Signs List 10, 49, 70 vehicle
12 diesel engine
14 exhaust pipe
16, 50, 72 flue gas purifying device
18 oxidation catalyst
20 DPF
21 urea SCR system
22 urea-water injecting unit
24 urea water tank
26 urea SCR catalytic unit
28 concentration measuring unit
30, 64 control unit
40 measuring unit body
42 optical fiber
44 measuring cell
46 light receiving unit
54 pretreatment ammonia-concentration measuring unit
56 isocyanic-acid-concentration measuring unit
58, 76 pretreatment nitrogen-oxide-concentration measuring unit
60, 78 treated nitrogen-oxide-concentration measuring unit
62 temperature adjusting unit

The invention claimed is:

1. A flue gas purifying device that reduces nitrogen oxides contained in flue gas discharged from an internal combustion engine, the device comprising:
   an exhaust pipe that guides flue gas discharged from the internal combustion engine;
   a urea-water injecting unit that injects urea water into the exhaust pipe;
   a catalytic unit that includes a urea SCR catalyst that promotes a reaction between ammonia produced from the injected urea water and the nitrogen oxides, and includes a support mechanism arranged inside of the exhaust pipe to support the urea SCR catalyst in the exhaust pipe, and is arranged on a downstream side to a position where the urea water is injected in a flow direction of the flue gas;
   an ammonia-concentration measuring unit arranged on a downstream side to the catalytic unit in a flow direction of the flue gas to measure an ammonia concentration in the flue gas having passed through the urea SCR catalyst;
a control unit that controls injection of the urea water by the urea-water injecting unit based on the ammonia concentration measured by the ammonia-concentration measuring unit;
an isocyanic-acid-concentration measuring unit arranged between the urea-water injecting unit and the catalytic unit in a flow direction of the flue gas to measure a concentration of isocyanic acid in flue gas; and
a temperature adjusting unit that adjusts a temperature of a flue-gas flow path between the urea-water injecting unit and the catalytic unit in a flow direction of the flue gas, wherein
a temperature of the flue-gas flow path is adjusted by the temperature adjusting unit based on a concentration of isocyanic acid measured by the isocyanic-acid-concentration measuring unit.

2. The flue gas purifying device according to claim 1, further comprising a pretreatment nitrogen-oxide-concentration measuring unit arranged between the urea-water injecting unit and the catalytic unit in a flow direction of the flue gas to measure a concentration of nitrogen oxides in flue gas, wherein
the control unit controls injection of urea water by the urea-water injecting unit based also on a concentration of nitrogen oxides measured by the pretreatment nitrogen-oxide-concentration measuring unit.

3. The flue gas purifying device according to claim 1, further comprising:
a pretreatment ammonia-concentration measuring unit arranged between the urea-water injecting unit and the catalytic unit in a flow direction of the flue gas to measure an ammonia concentration in flue gas; and
a temperature adjusting unit that adjusts a temperature of the flue-gas flow path between the urea-water injecting unit and the catalytic unit in a flow direction of the flue gas, wherein
a temperature of the flue-gas flow path is adjusted by the temperature adjusting unit based on an ammonia concentration measured by the pretreatment ammonia-concentration measuring unit.

4. The flue gas purifying device according to claim 1, further comprising a treated nitrogen-oxide-concentration measuring unit arranged on a downstream side to the catalytic unit in a flow direction of the flue gas to measure a concentration of nitrogen oxides in the flue gas having passed through the urea SCR catalyst, wherein
the control unit controls injection of urea water by the urea-water injecting unit based also on a concentration of nitrogen oxides measured by the treated nitrogen-oxide-concentration measuring unit.

5. The flue gas purifying device according to claim 4, further comprising a restoring unit that restores the urea SCR catalyst, when an ammonia concentration detected by the ammonia-concentration measuring unit and a concentration of nitrogen oxides measured by the treated nitrogen-oxide-concentration measuring unit both exceed a reference concentration, respectively.

6. The flue gas purifying device according to claim 5, wherein the restoring unit heats the urea SCR catalyst at a predetermined temperature.

7. The flue gas purifying device according to claim 4, comprising an informing unit that informs that the urea SCR catalyst needs to be replaced, when an ammonia concentration detected by the ammonia-concentration measuring unit and a concentration of nitrogen oxides measured by the treated nitrogen-oxide-concentration measuring unit both exceed a reference concentration, respectively.

8. A flue gas purifying device that reduces nitrogen oxides contained in flue gas discharged from an internal combustion engine, the device comprising:
an exhaust pipe that guides flue gas discharged from the internal combustion engine;
a urea-water injecting unit that injects urea water into the exhaust pipe;
a catalytic unit that includes a urea SCR catalyst that promotes a reaction between ammonia produced from injected urea water and the nitrogen oxides and a support mechanism arranged inside of the exhaust pipe to support the urea SCR catalyst in the exhaust pipe, and is arranged on a downstream side to a position where the urea water is injected in a flow direction of the flue gas;
a pretreatment nitrogen-oxide-concentration measuring unit arranged between the urea-water injecting unit and the catalytic unit in a flow direction of the flue gas to measure a concentration of nitrogen oxides in flue gas;
a treated nitrogen-oxide-concentration measuring unit arranged on a downstream side to the catalytic unit in a flow direction of the flue gas to measure a concentration of nitrogen oxides in the flue gas having passed through the urea SCR catalyst;
a control unit that calculates an ammonia concentration in flue gas having passed through the catalytic unit based on a difference between a concentration of nitrogen oxides measured by the pretreatment nitrogen-oxide-concentration measuring unit and a concentration of nitrogen oxides measured by the treated nitrogen-oxide-concentration measuring unit, and controls injection of urea water by the urea-water injecting unit based on a calculated ammonia concentration;
an isocyanic-acid-concentration measuring unit arranged between the urea-water injecting unit and the catalytic unit in a flow direction of the flue gas to measure a concentration of isocyanic acid in flue gas; and
a temperature adjusting unit that adjusts a temperature of a flue-gas flow path between the urea-water injecting unit and the catalytic unit in a flow direction of the flue gas, wherein
a temperature of the flue-gas flow path is adjusted by the temperature adjusting unit based on a concentration of isocyanic acid measured by the isocyanic-acid-concentration measuring unit.

9. A flue gas purifying device that reduces nitrogen oxides contained in flue gas discharged from an internal combustion engine, the device comprising:
an exhaust pipe that guides flue gas discharged from the internal combustion engine;
a urea-water injecting unit that injects urea water into the exhaust pipe;
a catalytic unit that includes a urea SCR catalyst that promotes a reaction between ammonia produced from the injected urea water and the nitrogen oxides, and includes a support mechanism arranged inside of the exhaust pipe to support the urea SCR catalyst in the exhaust pipe, and is arranged on a downstream side to a position where the urea water is injected in a flow direction of the flue gas;
an ammonia-concentration measuring unit arranged on a downstream side to the catalytic unit in a flow direction of the flue gas to measure an ammonia concentration in the flue gas having passed through the urea SCR catalyst;

a control unit that controls injection of the urea water by the urea-water injecting unit based on the ammonia concentration measured by the ammonia-concentration measuring unit;

a pretreatment ammonia-concentration measuring unit arranged between the urea-water injecting unit and the catalytic unit in a flow direction of the flue gas to measure an ammonia concentration in flue gas; and a temperature adjusting unit that adjusts a temperature of the flue-gas flow path between the urea-water injecting unit and the catalytic unit in a flow direction of the flue gas, wherein a temperature of the flue-gas flow path is adjusted by the temperature adjusting unit based on an ammonia concentration measured by the pretreatment ammonia-concentration measuring unit.

10. The flue gas purifying device according to claim 9, further comprising a pretreatment nitrogen-oxide-concentration measuring unit arranged between the urea-water injecting unit and the catalytic unit in a flow direction of the flue gas to measure a concentration of nitrogen oxides in flue gas, wherein the control unit controls injection of urea water by the urea-water injecting unit based also on a concentration of nitrogen oxides measured by the pretreatment nitrogen-oxide-concentration measuring unit.

11. The flue gas purifying device according to claim 9, further comprising a treated nitrogen-oxide-concentration measuring unit arranged on a downstream side to the catalytic unit in a flow direction of the flue gas to measure a concentration of nitrogen oxides in the flue gas having passed through the urea SCR catalyst, wherein the control unit controls injection of urea water by the urea-water injecting unit based also on a concentration of nitrogen oxides measured by the treated nitrogen-oxide-concentration measuring unit.

12. The flue gas purifying device according to claim 11, further comprising a restoring unit that restores the urea SCR catalyst, when an ammonia concentration detected by the ammonia-concentration measuring unit and a concentration of nitrogen oxides measured by the treated nitrogen-oxide-concentration measuring unit both exceed a reference concentration, respectively.

13. The flue gas purifying device according to claim 12, wherein the restoring unit heats the urea SCR catalyst at a predetermined temperature.

14. The flue gas purifying device according to claim 11, comprising an informing unit that informs that the urea SCR catalyst needs to be replaced, when an ammonia concentration detected by the ammonia-concentration measuring unit and a concentration of nitrogen oxides measured by the treated nitrogen-oxide-concentration measuring unit both exceed a reference concentration, respectively.

\* \* \* \* \*